J. JENSEN.
MANUFACTURE OF HOUND-PLATES FOR VEHICLES.

No. 171,287.  Patented Dec. 21, 1875.

Attest:
Wm Bagger
C. A. Snow.

Inventor:
Jens Jensen,
by Louis Bagger
atty.

UNITED STATES PATENT OFFICE.

JENS JENSEN, OF RACINE, WISCONSIN.

IMPROVEMENT IN THE MANUFACTURE OF HOUND-PLATES FOR VEHICLES.

Specification forming part of Letters Patent No. 171,287, dated December 21, 1875; application filed July 26, 1875.

*To all whom it may concern:*

Be it known that I, JENS JENSEN, of Racine, in the county of Racine and State of Wisconsin, have invented certain new and useful Improvements in the Manufacture of Hound-Plates for Wagons; and I do hereby declare that the following is a full, clear, and exact description thereof, which will enable others skilled in the art to which it pertains to make and use the same, reference being had to the accompanying drawing, and to the letters of reference marked thereon, which form a part of this specification, and in which—

Figure 1:
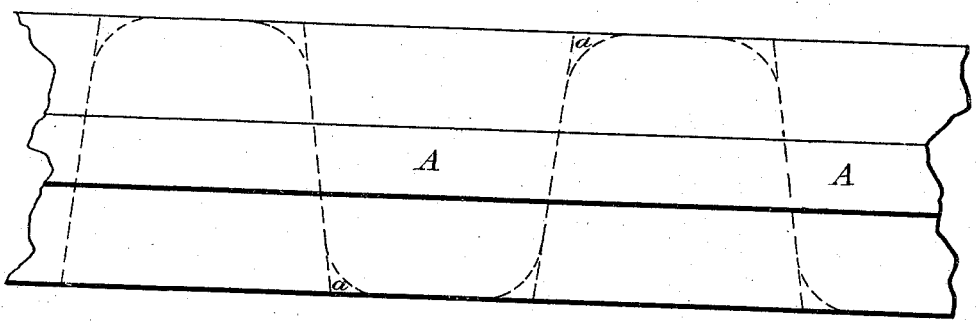
Figure 2:
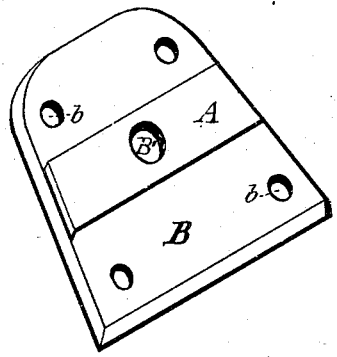
Figure 3:
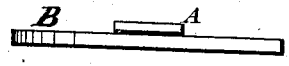

Figure 1 is a top view of the bar or blank from which I manufacture my improved hound-plates; and Fig. 2 is a perspective view of the finished plate, and Fig. 3 is a side view of the same.

Similar letters of reference indicate corresponding parts in all the figures.

The nature of this invention is fully shown and described in the drawing and in the following description:

Fig. 1 represents the bar or blank, (top plan,) which has a raised rib or flange, A, running longitudinally through the middle. This rib may either be riveted onto the bar or rolled in one piece therewith by the aid of suitable rolls. The bar should be of a width corresponding to the length the hound-plates are to have. It is then cut obliquely across, as indicated by the dotted lines in Fig. 1, after which the corners (denoted by *a*) are rounded off, and the holes B' *b* are made for the insertion of the king-bolt and fastening-bolts, after which the plates are finished in the usual manner.

By my improved method of manufacture much time and labor are saved, and a better article is produced than by the ordinary method of forging the plates from a flat bar.

The raised rib across the middle of each plate will give strength to the plate where the strain and wear are greatest, and where strength and thickness of material are most needed, and will save the unnecessary expense and clumsiness resultant from having too much metal distributed in parts where it is not required.

Having thus described my invention, I claim and desire to secure by Letters Patent of the United States—

As an improvement in the art of manufacturing hound-plates for wagons or vehicles, the method herein described, consisting in, first, preparing a bar of iron of any suitable length having a raised longitudinal rib or flange, A, and of a width corresponding to the length the hound-plates are to have; second, cutting said bar across obliquely; and, third, rounding off the corners and drilling the holes to form the finished plate, substantially in the manner and for the purpose herein shown and specified.

In testimony that I claim the foregoing as my own I have hereunto affixed my signature in presence of two witnesses.

JENS JENSEN.

Witnesses:
 GEO. C. COMOE,
 JOHN W. KNIGHT.